(12) United States Patent  
Varanasi et al.

(10) Patent No.: US 8,983,019 B2
(45) Date of Patent: Mar. 17, 2015

(54) SUPERWETTING SURFACES FOR DIMINISHING LEIDENFROST EFFECT, METHODS OF MAKING AND DEVICES INCORPORATING THE SAME

(75) Inventors: Kripa K. Varanasi, Lincoln, MA (US); Jonathan D. Smith, Cambridge, MA (US); Adam T. Paxson, Cambridge, MA (US); Christopher J. Love, Atlantis, FL (US); Hyukmin Kwon, Cambridge, MA (US); Dieter B. Brommer, Exeter, NH (US)

(73) Assignee: Massachusetts Institute of Technology, Cambridge, MA (US)

( * ) Notice: Subject to any disclaimer, the term of this patent is extended or adjusted under 35 U.S.C. 154(b) by 493 days.

(21) Appl. No.: 12/872,353

(22) Filed: Aug. 31, 2010

(65) Prior Publication Data

US 2012/0051489 A1    Mar. 1, 2012

(51) Int. Cl.
*G21C 3/00* (2006.01)
*F28F 13/18* (2006.01)
*G21C 3/08* (2006.01)
*G21C 3/07* (2006.01)

(52) U.S. Cl.
CPC ............. *F28F 13/182* (2013.01); *F28F 13/185* (2013.01); *G21C 3/08* (2013.01); *G21C 3/07* (2013.01); *Y02E 30/40* (2013.01); *F28F 2255/20* (2013.01)
USPC ........................................................ 376/424

(58) Field of Classification Search
USPC ......................................................... 376/424
See application file for complete search history.

(56) References Cited

U.S. PATENT DOCUMENTS

| 7,219,713 B2 | 5/2007 | Gelorme et al. |
| 2003/0104170 A1 | 6/2003 | Johnston et al. |

(Continued)

FOREIGN PATENT DOCUMENTS

| WO | 2009024124 A2 | 2/2009 |
| WO | WO 2010012798 A1 * | 2/2010 |

OTHER PUBLICATIONS

Takamasa et al, Radiation inducted surface activation on Leidenfrost and quenching phenomena, Mar. 2005, Ezperimental Theram and Fluid Science, vol. 29, Issue 3, pp. 267-274.*

(Continued)

*Primary Examiner* — Timothy A Brainard
(74) *Attorney, Agent, or Firm* — Sam Pasternack; MIT Technology Licensing Office

(57) ABSTRACT

Textured surface for increasing Leidenfrost temperature. The texture comprises of surface features over multiple length scales—from micro to nanoscale—wherein the features at each length scale have a size, aspect ratio, and spacing selected to increase the Leidenfrost temperature. The structure includes an array of microscale structures disposed on the surface, the structure having size, aspect ratio and spacing selected to increase Leidenfrost temperature. The microscale structures may also include nanoscale structures on their surface to create a hierarchical structure. The structures result in an increased Leidenfrost temperature.

52 Claims, 15 Drawing Sheets

(56) References Cited

U.S. PATENT DOCUMENTS

| | | | |
|---|---|---|---|
| 2005/0001266 A1* | 1/2005 | Kim | 257/330 |
| 2006/0040164 A1* | 2/2006 | Vyas et al. | 429/34 |
| 2007/0059213 A1* | 3/2007 | Aizenberg et al. | 422/99 |
| 2008/0223717 A1* | 9/2008 | Isaksson et al. | 204/242 |
| 2009/0095444 A1 | 4/2009 | Bezama et al. | |
| 2010/0034335 A1* | 2/2010 | Varanasi et al. | 376/412 |
| 2010/0216668 A1* | 8/2010 | Shibahara | 506/16 |
| 2011/0198059 A1* | 8/2011 | Gavillet et al. | 165/104.26 |
| 2011/0206909 A1* | 8/2011 | Sneh | 428/195.1 |
| 2011/0266151 A1* | 11/2011 | Jansson | 204/451 |

OTHER PUBLICATIONS

International Search Report and Written Opinion issued in connection with International Patent Application No. PCT/US2011/043696 mailed Feb. 8, 2012.

C.W. Extrand et al., "Superwetting of Structured Surfaces", Langmuir, vol. 23, No. 17, Aug. 1, 2007, pp. 8882-8890.

Bernadin, J.D. et al. "Mapping of Impact and Heat Transfer Regimes of Water Drops Impinging on a Polished Surface," Int. J. Heat Mass Transfer 40 (1997) 247-267.

Biance, A.L., et al. "Leidenfrost Drops," Phys Fluids 15 (2003) 1632-1637.

\* cited by examiner

Fuel rod array

Large amount of neutron flux exists outside fuel rod

Neutron flux in fuel rod is decreased as there is less liquid present to slow down and return neurons to core.

By overcoming Leidenfrost effect liquid can always wet the surface and improve fission

SUPERWETTING SURFACES FOR DIMINISHING LEIDENFROST EFFECT, METHODS OF MAKING AND DEVICES INCORPORATING THE SAME

BACKGROUND OF THE INVENTION

This invention relates to surfaces for diminishing the Leidenfrost effect and more particularly to surfaces having multiple length-scale textures including micro- and/or nanoscale texturing to diminish the Leidenfrost effect.

The heat transfer of droplets or sprays impinging on a super-heated dry surface or pool boiling can be categorized into four regimes: single-phase liquid evaporative cooling, nucleate boiling, transition boiling and film boiling. See, Bernadin, J. D., et al. "Mapping of Impact and Heat Transfer Regimes of Water props Impinging on a Polished Surface," *Int. J. Heat Mass Transfer* 40 (1997) 247-267. The boundary between nucleate boiling and transition boiling is the point of the highest heat transfer coefficient and is denoted as the critical heat flux (CHF) point. The boundary between transition boiling and film boiling is the point of lowest heat transfer coefficient and is denoted as the Leidenfrost point (LFP). The LFP is characterized by levitation of a droplet above a heated surface, supported by the excess pressure of the vapor generated between the droplet and the solid surface. See, Biance, A. L., et al. "Leidenfrost props," *Phys Fluids* 15 (2003) 1632-1637. As power densities continue to increase, the nature of the droplet-surface interaction will fundamentally limit this process. This limitation arises from the Leidenfrost effect, in which thin vapor film formation under the drops prevents surface wetting. Under such circumstances, heat transfer occurs via conduction through the vapor films leading to dry-out, catastrophically high surface temperatures, and failure of the device. This fundamental limitation leads to the classical catastrophic kink instability (for temperatures beyond the critical heat flux temperature) in the heat flux versus temperature curve. As a result, two-phase cooling solutions have to operate at significantly lower heat flux levels. Similar limitations are encountered in quenching and some coating processes.

It is an object of the present invention to overcome these significant limitations by engineering multiple length scale super wetting surfaces including surfaces with micro- and nano-structures that can fundamentally alter droplet-surface interactions to continuously rewet the surface, prevent vapor film formation, and enhance the Leidenfrost temperature.

SUMMARY OF THE INVENTION

In a first aspect, the invention is a textured surface for increasing Leidenfrost temperature. The surface includes an array of microscale structures extending from the surface, the structures having size, height and spacing selected to increase the Leidenfrost temperature. In a preferred embodiment, the texture comprises of surface features over multiple length scales—from micro to nanoscale—wherein the features at each length scale have a size, height, and spacing selected to increase the Leidenfrost temperature. In one embodiment the surface includes microscale structures disposed with nanoscale structures on their surfaces. The size, height and spacing of the microscale and nanoscale structures are selected to maximize the Leidenfrost temperature. The term height could also mean depth of the features In a preferred embodiment, the microscale structures are posts with a width a, height h and spacing b wherein the b/a ratio and h/a ratio are selected to increase Leidenfrost temperature. The nanoscale structures may be particles. The particles are preferably in the size range of 15 nm to 500 nm. The b/a ratio may be in the range of 0.25 to 10. The microscale features may have a width upto 100 μm. In another embodiment the multiscale structure comprises of microscale structures that may be porous material with nanoscale features disposed on the material.

In another embodiment, the invention is a hierarchically textured surface for increasing the Leidenfrost temperature including an array of microscale structures extending from the surface, the structures having a selected size, height and spacing. Nanoscale structures having a selected size range are disposed on the microscale structures whereby the Leidenfrost temperature is increased.

DESCRIPTION OF THE PREFERRED EMBODIMENT

Figures 1A, 1B:
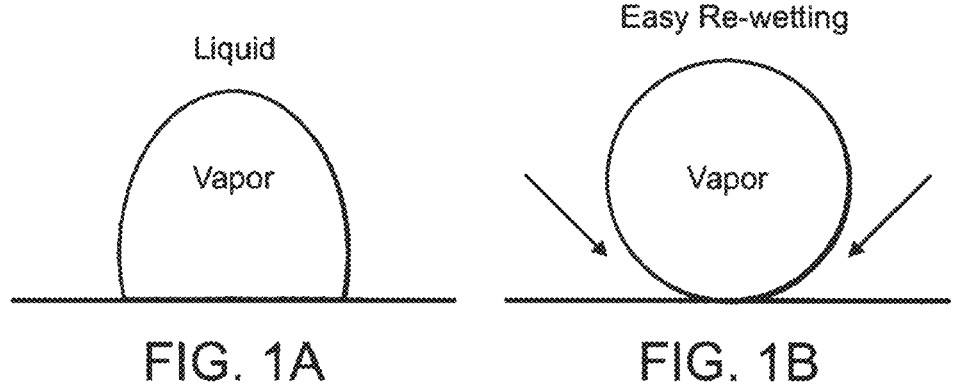
FIGS. 1a and 1b are schematic illustrations showing the effect of surface wettability on the state of the vapor bubble attachment to the surface.

First, some of the theory on which the present invention is based will be discussed. Superwetting nanostructures can continuously allow droplets to rewet a surface and prevent vapor film formation as shown in FIG. 1. FIG. 1 shows the effect of surface wettability on rewetting. In FIG. 1a, partial surface wetting causes a vapor bubble to stick to the surface and prevent rewetting. As shown in FIG. 1b, superwetting surfaces disclosed herein can easily allow liquid to rewet a surface and forces a vapor bubble to detach from the surface. This increased rewetting along with the increased nucleation sites will significantly increase the maximum heat flux and Leidenfrost temperatures and therefore prevent vapor-film formation, boiling transition, and "dry-out" conditions to occur. Furthermore, the superwetting nature of the surface could increase the droplet rewetting Leidenfrost temperature limit and enhance heat transfer during droplet or liquid jet impingement on the surface in these situations by increasing the rewetting of the surface as well as by providing a path for vapor escape from underneath the impinging droplet or jet. This effect can also lead to significantly improved wetting of superheated surfaces in operations such as quenching, spray cooling, droplet rewetting on fuel rods and cladding surface in nuclear reactors, boilers, thermal spray coatings, etc. An ultimate goal would be to completely eliminate the kink in the boiling curve so that CHF limitations can be completely eliminated. Based on experiments and theoretical calculations, the inventors herein have identified a new design space of surface textures that can significantly enhance nucleate boiling, prevent dryout, and significantly diminish the Leidenfrost limits. The concepts disclosed herein utilize multiple length scale surface features including hierarchical nano/micro surface design.

Figure 2A:
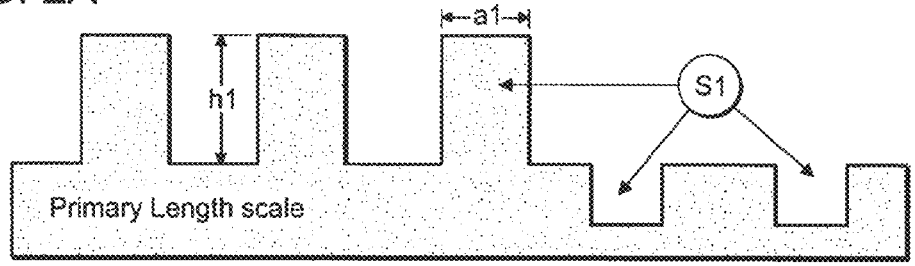
FIGS. 2a, b, c, d and e are illustrations of multiple length scale structures disclosed herein.
Figure 2B:
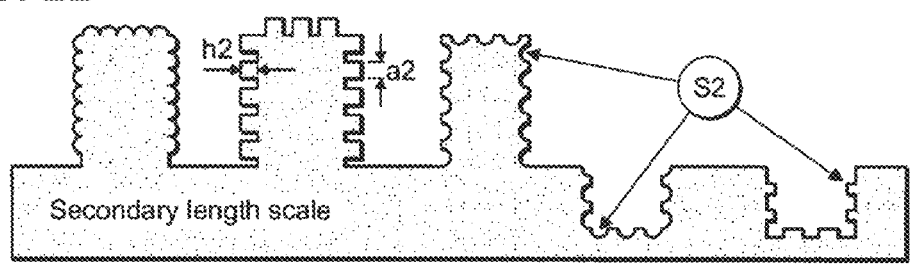
Figure 2C:
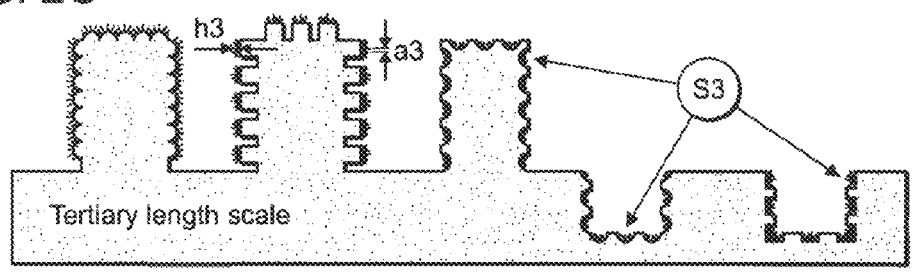
Figure 2D:
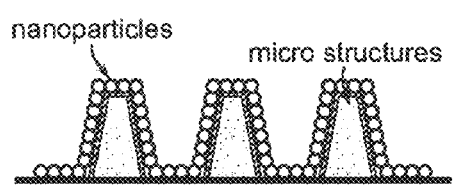
Figure 2E:

With reference to FIGS. 2a, b, c, d and e, shown are exemplary structures having superwetting characteristics. In particular, these structures include protrusions, cavities or combinations of both selected to increase Leidenfrost temperature. The structures in FIGS. 2b, 2c and 2d have hierarchical features while FIG. 2e has a gradient of surface feature sizes.

Figure 3B:
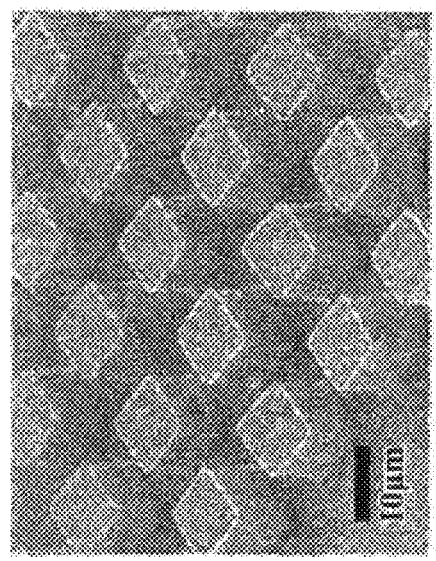
FIGS. 3a and 3b are photomicrographs of embodiments of the invention disclosed herein.
Figure 3A:
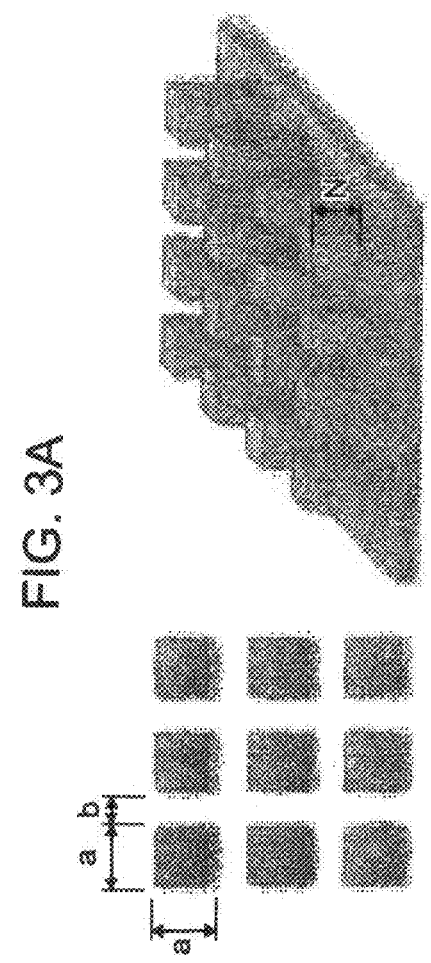

In one embodiment, microscale square posts were fabricated on silicon wafers with regular micro-electromechanical system processes such as photolithography followed by reactive ion etch. Square posts of 10×10 µm² and 3×3 µm² cross sections were etched with different pitches and aspect ratios as shown in FIG. 3a. After the posts were fabricated they were cleaned by a 5:1 mixture of 98% sulfuric acid and 30% hydrogen peroxide available from Sigma Aldrich. This cleaning process enables silicon dioxide surfaces to become more hydrophilic. In order to provide nanoscale texture, silica particles with diameters in the range of 15 nm to 250 nm were self-assembled on the square posts and then sintered. Porous metal substrates were also fabricated using normal ceramic processes by pressing powder and then sintering. FIG. 3b is an SEM image of the fabricated silicon structured surface with 10 µm tall, 10×10 µm² posts having a pitch dimension of 5 µm.

Figure 4:
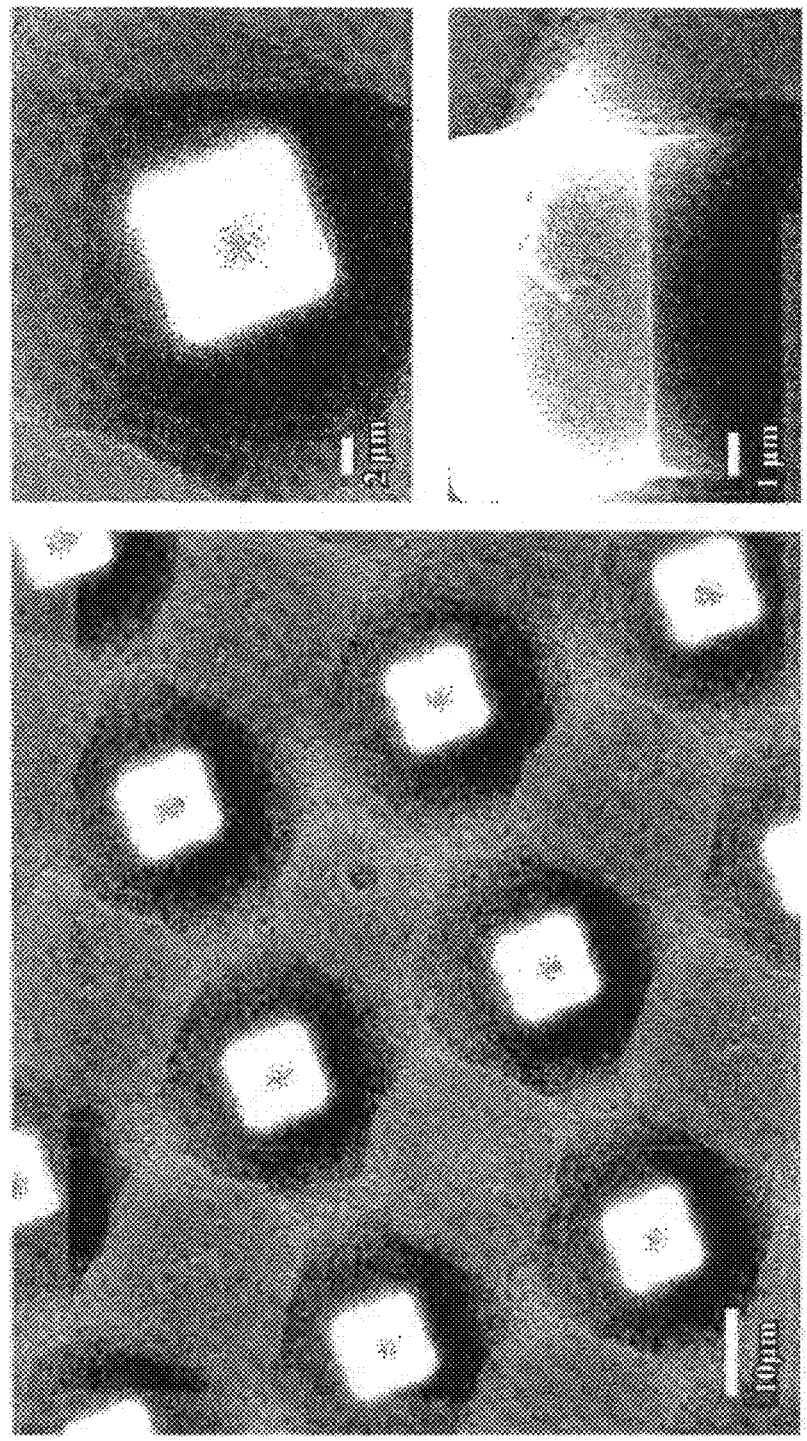
FIG. 4 are SEM images of silica particles self-assembled on a micro-scale structured surface.

With reference to FIG. 4, shown are SEM images of a hierarchical structure that was made by self assembling silica particles on a microscale structured surface. In this example, approximately 230 nm diameter particles (Ultra High Purity Colloidal Silica, PL-20, FUSO chemical Co. Ltd., Japan) were self-assembled (1000 rpm for 30 seconds) on approximately 4 µm tall, 10 µm² cross-sectional area posts with 15 µm spacing. The left image in FIG. 4 is at 2000×; the top right image is at 8000×; and the lower right image is at 25000×.

Figure 5:
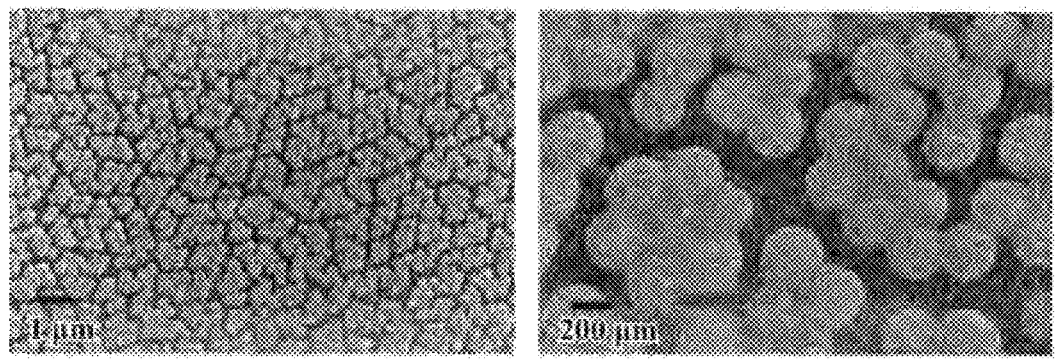
FIG. 5 are SEM images of silica particles self-assembled on a flat silicon substrate.

Another example is shown in FIG. 5. In this example, after self assembly of nano particles on flat surfaces, the particles can be made to gather into clusters. They may form a hierarchical structure. Approximately 230 nm silica particles were self-assembled on a smooth, flat silicon substrate followed by sintering (baking) at 1100° C. for 30 minutes. The resulting clusters made from the particles are a few µm in size. The left image in FIG. 5 was made at 20000× and the right image at 100000×.

Figure 6:
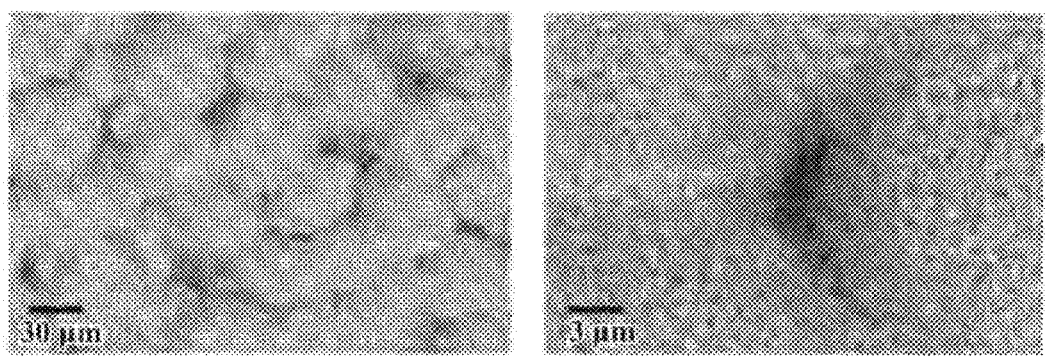
FIG. 6 are SEM images of porous copper having pores between copper particles, nanoscale cavities and nanowires on copper particles.
Figure 6:
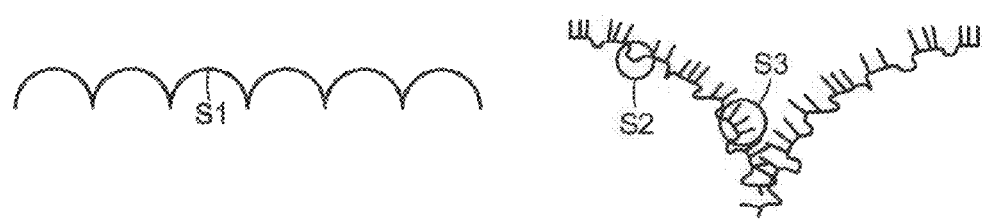

Yet another example structure is shown in FIG. 6 in which porous copper includes pores between necked micro-scale copper particles, nano-scale cavities and nano-wires on the copper particles. In this example, approximately 50 µm diameter copper powders were packed and pressed under 20 kpsi and then sintered at 700° C. for 15 minutes. The left image in FIG. 6 was made at 1000×, and the right image at 5000×.

Experiments have been performed to assess the enhanced wettability. A millimetric droplet was gently deposited on each substrate whose temperature was kept constant by seating on a hot stage. Initial behavior of a deposited droplet was recorded by a high-speed video camera, Phantom V7 by Vision Research, Inc. The liquid droplets were preheated to the highest possible temperature where water does not nucleate to form a gas bubble. The preheating temperature was limited since it is difficult to control the volume in a liquid droplet as bubbles start to nucleate. The hot stage used was an assembly including a ceramic heater controlled by a temperature controller manufactured by Watlow Electric Manufacturing Company. An aluminum plate was laid on the heater and a thermal insulation block enveloped the entire assembly. It is preferred that the aluminum plate has small holes right beneath the top surface for receiving thermocouples that allow one to measure as accurate a temperature as possible.

Figure 7A:
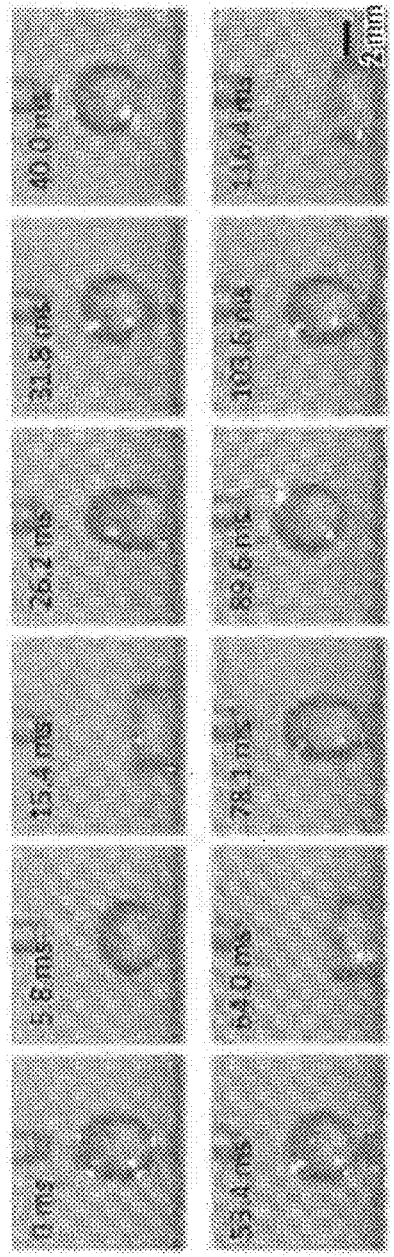
FIGS. 7a and 7b are photomicrographs showing drop behaviors on hot surfaces.
Figure 7B:
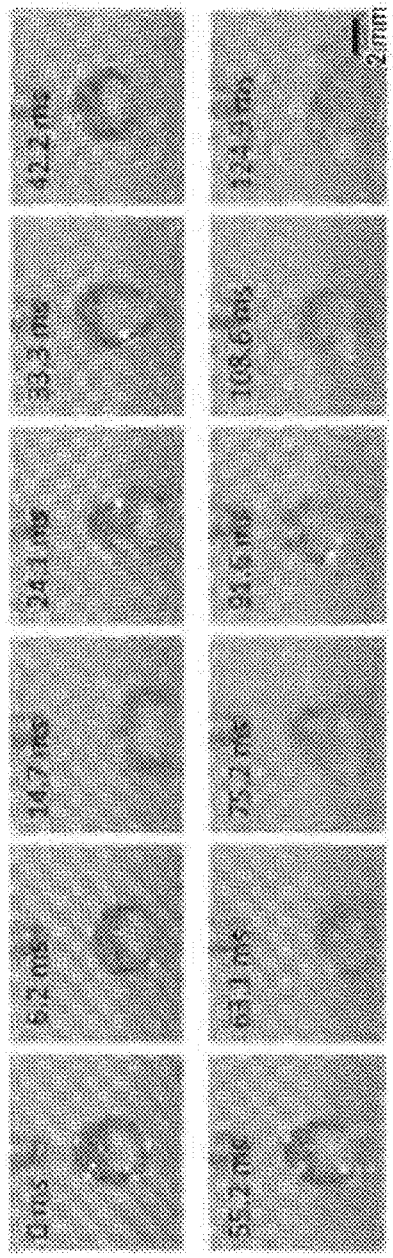

With reference to FIG. 7a, 32 µL droplets were deposited on a 310° C. substrate. As a drop initially touches the substrate, we observed two different behaviors, nucleate boiling and film boiling. In nucleate boiling, nucleation arises both inside and on the surface of a liquid drop as shown in FIG. 7b. At a relatively higher temperature, liquid droplets never go through any changes but begin bouncing as shown in FIG. 7a because of a thin vapor film, namely, film boiling behavior. We looked into the temperature borderline between the two behaviors, defined as the Leidenfrost temperature, for all different scale structured substrates. As shown in FIG. 7b, nucleation starts on the structured surface having the 10 µm² pillar array with an aspect ratio (h/a) of approximately 1, and a spacing ratio (b/a) of approximately 4.

Figure 8:
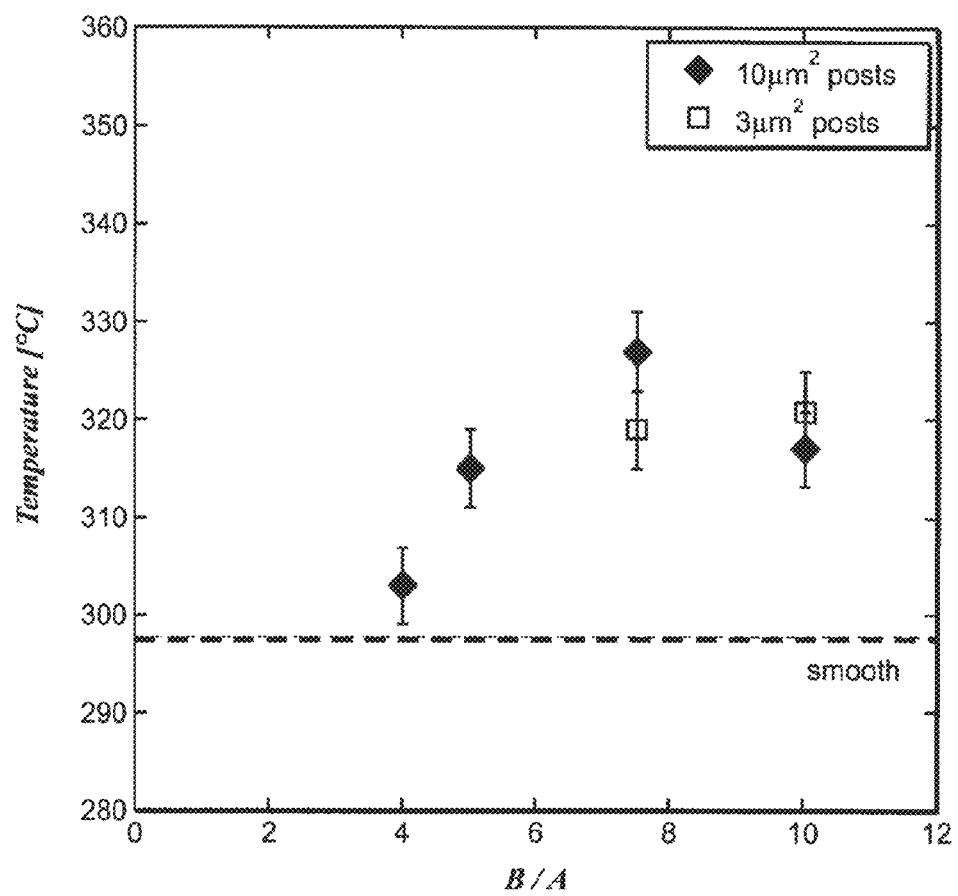
FIG. 8 is a graph of experimental measurements of Leidenfrost temperature versus b/a of a single length-scale microscale structure.

Experimental results on microscale structured surfaces are shown in FIG. 8. In FIG. 8, the filled diamond marks are from a silicon surface with 10×10 µm² posts and the square marks are from a surface with 3×3 µm² posts. In both cases, the aspect ratio is approximately 1. As compared to a smooth surface (dashed line), the Leidenfrost temperatures are higher on the square pillared substrates. The Leidenfrost temperature also varies with the pitch of the structure as well as the size of the square posts. FIG. 8 implies that there is an optimal spacing ratio which maximizes the Leidenfrost temperature as compared to the smooth surface.

It should be noted that on the hierarchical porous copper substrate shown in FIG. 6, we observed nucleate boiling behavior as high as 400° C., the limit of the experiment.

We next developed a mathematical model relating to this invention. As a droplet is deposited on a hot enough solid, it is levitated by a thin vapor film evaporated from the surface of the droplet. On our single scale structured surface as illustrated in FIG. 3a, a droplet at the boundary between a Leidenfrost drop and a rewetting nucleation drop is assumed to be seated at the top of the pillars. The heat transferred to the droplet is proportional to the contact surface area $\pi R_b^2$ and the effective heat conductivity of the composition of solid squares and the vapor surrounding them, $k_{eff}$. Then, the rate of evaporation is determined by the transferred heat and latent heat of evaporation which is $$\dot{m}_e = \frac{k_{eff}}{h_{fg}} \frac{\Delta T}{h} \pi R_b^2.$$

The vapor from the drop escapes through the pillars and it is possible to be considered as a flow through porous media. Since the vapor layer is thin enough to be assumed to be one dimensional, we can introduce Darcy's law to the vapor flow escaping from the structured surface. Then, we get the vapor flow rate $$\dot{m}_v = 2\pi \rho_v \frac{K}{\mu} HR_b \Delta P$$

where K is the permeability of the pillar structure, $\rho_v$ is the density of the vapor, $\mu$ is the kinetic viscosity of the vapor and $\Delta P$ is the wetting pressure inducing flow from the pillars.

For a small droplet (R<$l_c$) where $l_c$ is capillary length, $l_c=(\gamma/\rho g)^{0.5}$, the radius of the drop basement, $R_b$, is scaled to the square of the drop radius, R, as $$R_b \sim \frac{R^2}{l_c}.$$

Also, the wetting pressure is dominated by capillary pressure among the pillars. This pressure is given by $\Delta P=2\sqrt{2}\gamma \cos \theta_A/B$ where $\gamma$ is the surface tension of the liquid, and $\theta_A$ is the advancing contact angle of liquid on the solid surface. By balancing the rate of evaporation and the vapor flow rate, we get the result with a reasonable scaling parameter as plotted in FIG. 9. The Leidenfrost temperature changes according to design parameters such as the spacing ratio (b/a) and the aspect ratio (h/a), and there are optimal design values that maximize the Leidenfrost temperature.

For a hierarchical structure which is a microscale structure coated by nanoscale particles such as silica, only the wetting pressure changes because the capillary pressure through pores in the network of silica particles becomes dominant, which is given by $$\Delta P^* = 2\sqrt{2}\gamma \cos \theta_A/d_{avg}$$

where $d_{avg}$ is the average pore diameter of the silica particle network. The result is plotted in FIG. 9. As the space of microscale posts gets larger, the resistance against the vapor flow becomes smaller due to the larger permeability of the structure. However it settles at an asymptote because the surface characteristics become flat as the space among pillars gets to be too large.

Figure 9A:
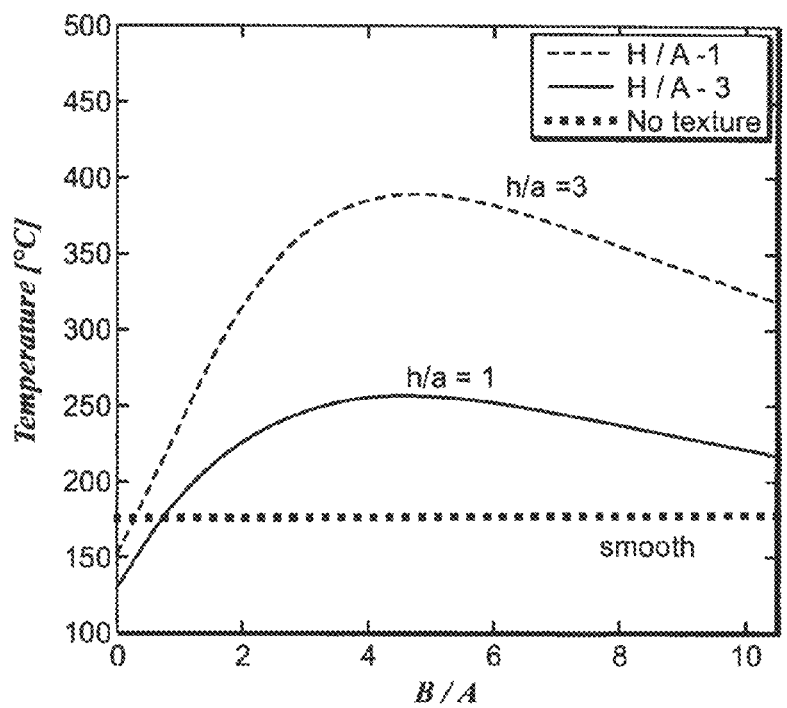
FIGS. 9a and 9b are graphs of Leidenfrost temperature plotted for different design parameters of spacing ratio and aspect ratio.
Figure 9B:
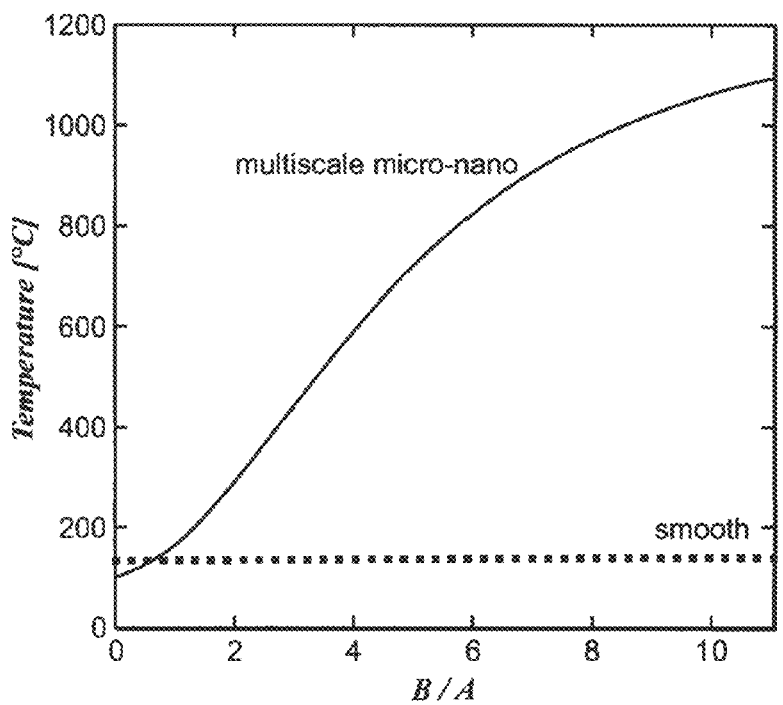

With respect to FIG. 9a, in the case of microscale structures, the solid line represents the Leidenfrost temperature for h/a of approximately 3 and the dashed line is for h/a of approximately 1. The dotted line is the Leidenfrost temperature of the same drop on a flat surface. For a hierarchical structure as shown in FIG. 9b, the solid line is plotted for the average pore size of 500 nm. Significant enhancements of the Leidenfrost temperature are predicted on the surface with multiscale (micro-nano) structures. In the plots in FIG. 9, the volume of the drop is chosen to be 32 μL, the surface properties are adapted from silicon dioxide, and the height, h, is 9 μm.

Figure 10:
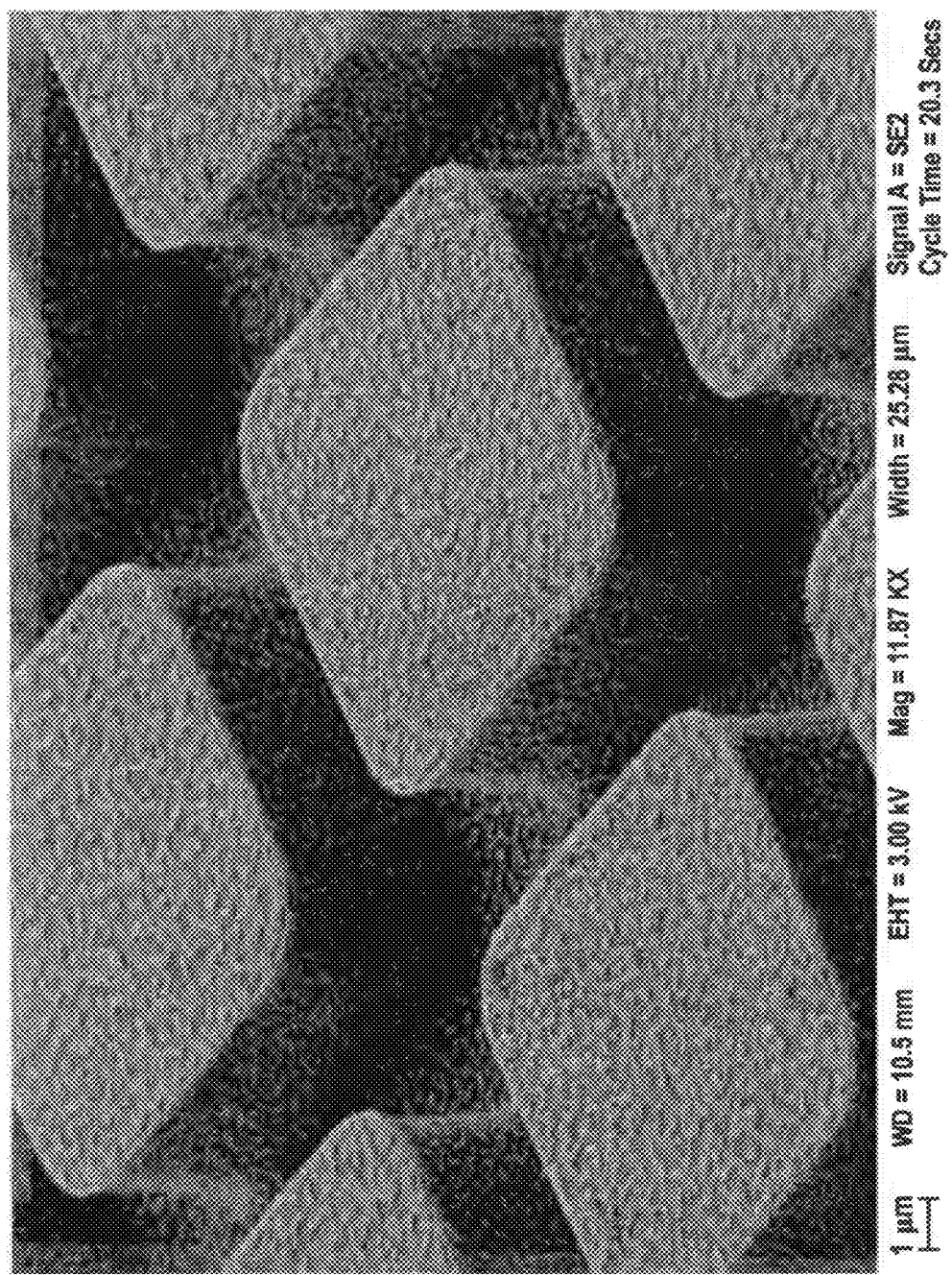
FIGS. 10, 11, 12 and 13 are photomicrographs of structures having multiple length scales.
Figure 11:
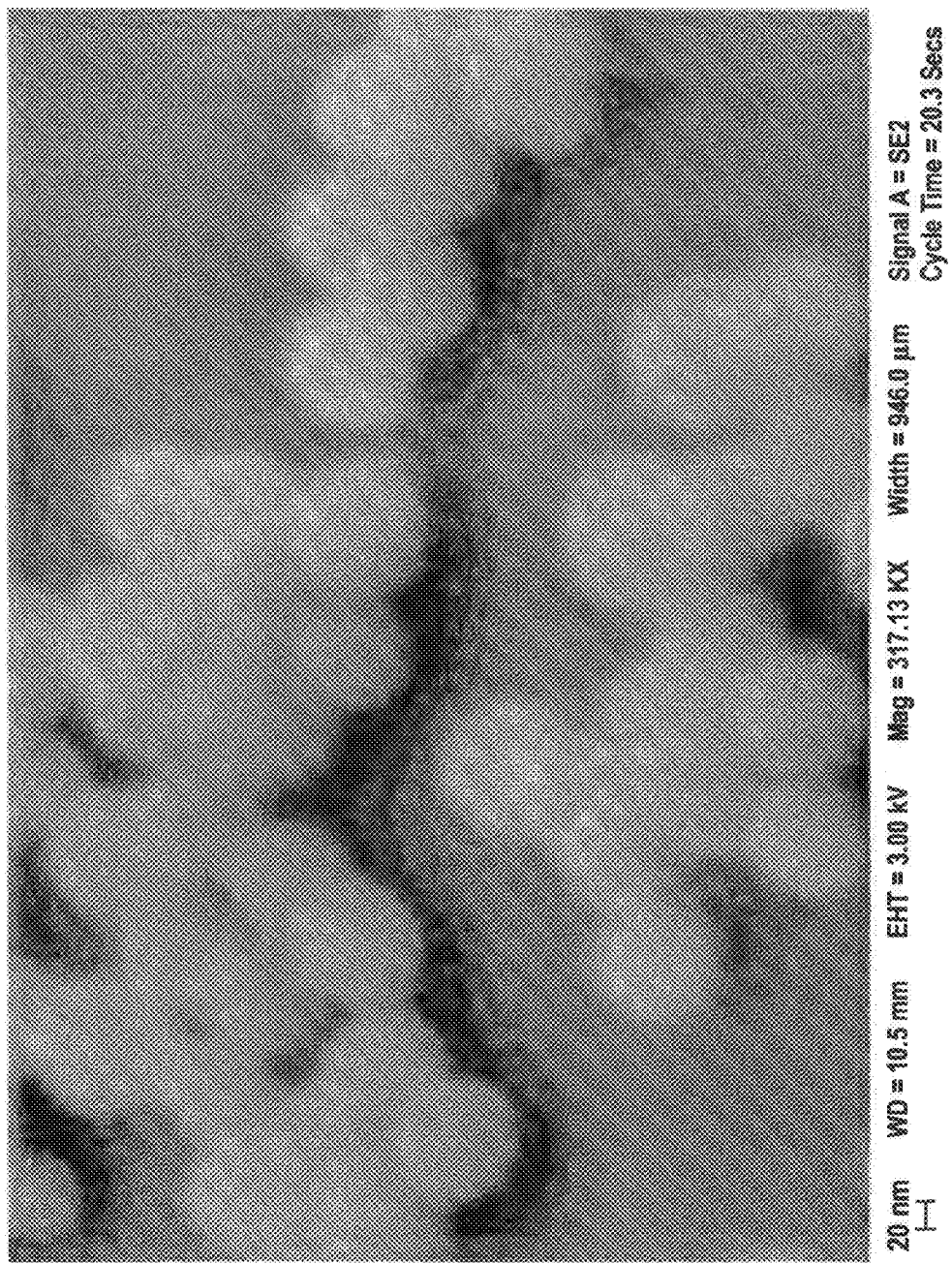

Another example of textured surfaces disclosed herein is shown in FIGS. 10 and 11 below. In this example 70 nm particles are deposited onto the 10 um posts. In order to deposit the particles, the substrate with silicon posts was plasma cleaned in oxygen plasma, giving it a negative charge. The substrate with the posts was then dipped in a solution of PAH and water for 15 minutes, leaving a positive charge on the surface. The surface was then dipped into a suspension of 70 nm silica particles (Ultra High Purity Colloidal Silica, PL-7, FUSO chemical Co. Ltd., Japan) for 15 minutes while the negatively charged colloidal silica particles adsorbed onto the positively charged surface. After each 15-minute dip the substrate is dipped in rinse water for a few minutes.

Figure 12:
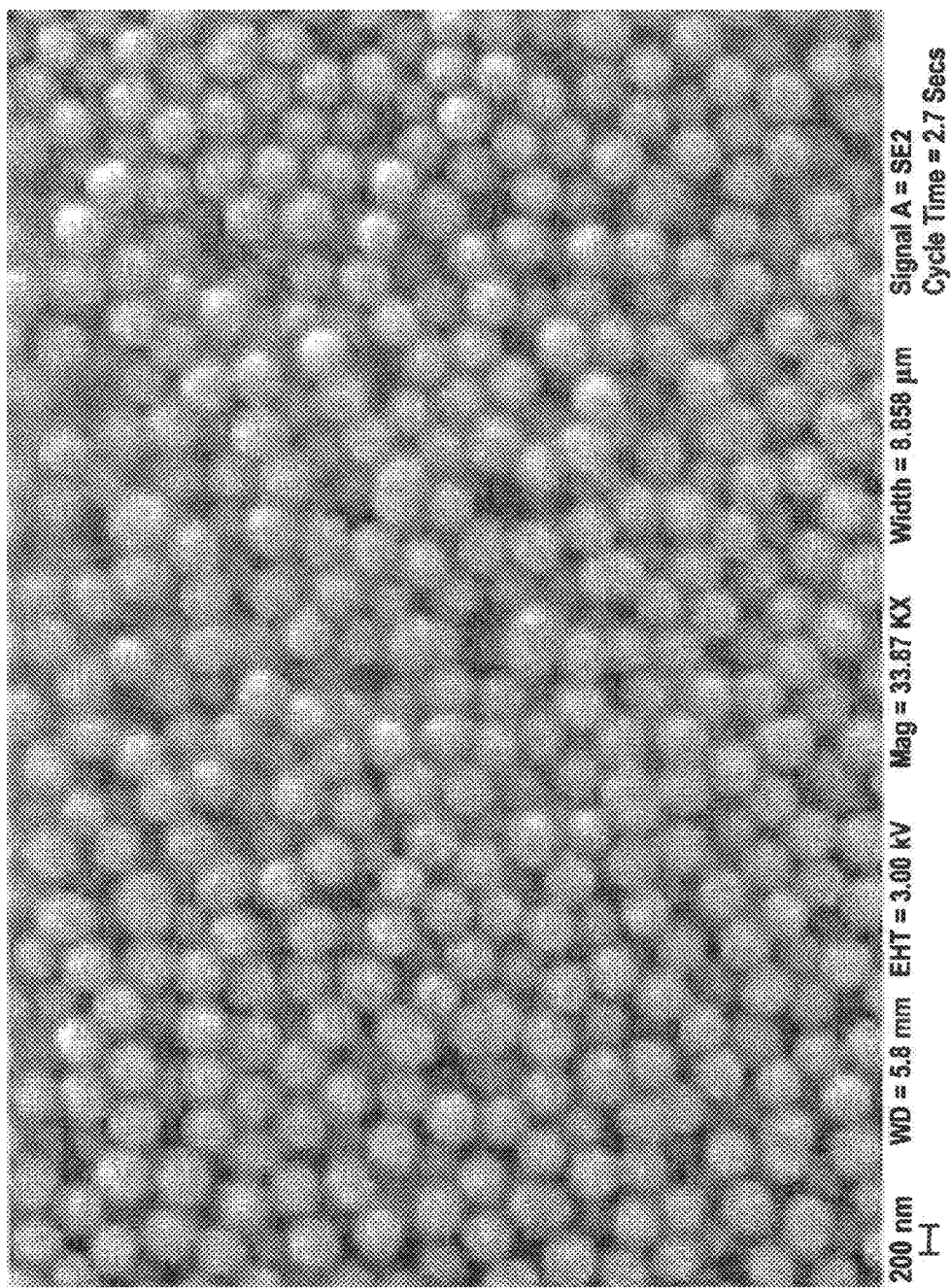
Figure 13:
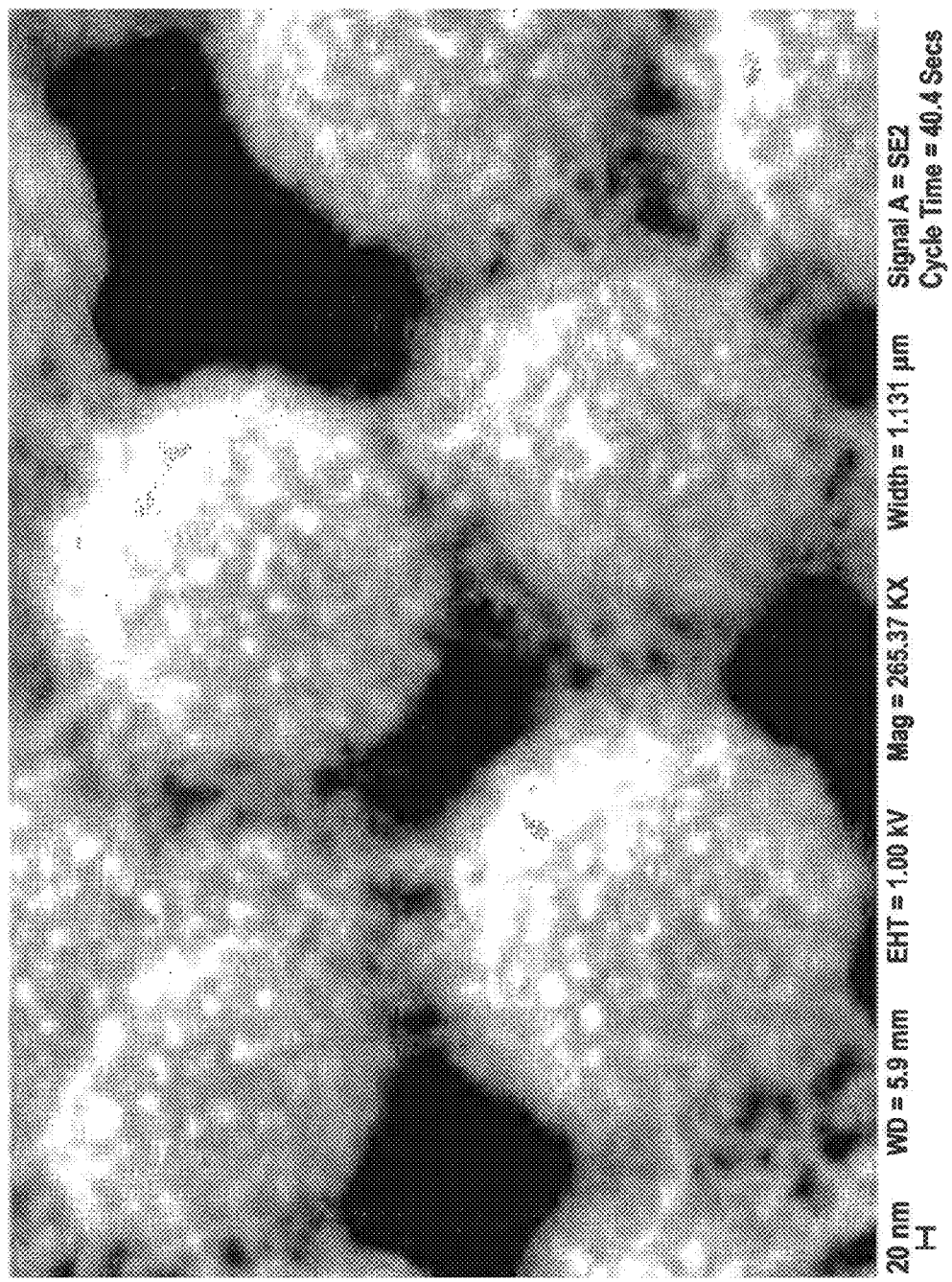

Another example is shown in FIGS. 12 and 13. This example shows 10 nm particles deposited on 230 nm particles. In order to deposit the particles, a silicon substrate was plasma cleaned in oxygen plasma, giving it a negative charge. The substrate was then dipped in a solution of PAH and water for 15 minutes, leaving a positive charge on the surface. The surface was then dipped into a suspension of 230 nm silica particles (Ultra High Purity Colloidal Silica, PL-20, FUSO chemical Co. Ltd., Japan) for 15 minutes while the negatively charged colloidal silica particles adsorbed onto the positively charged surface. The substrate was dipped into the solution of PAH again for 15 minutes. It was then dipped into a suspension of 10 nm silica particles for 15 minutes. (Ultra High Purity Colloidal Silica, PL-1, FUSO chemical Co. Ltd., Japan). After each 15-minute dip the substrate is dipped in rinse water for a few minutes.

Multiscale structures including tri-modal structure could be produced by dipping following the method described in the example of FIGS. 12 and 13 but by using a substrate with posts rather than a smooth substrate initially. Or a 4-level structure could be 10 nm particles on 100 nm particles on 1 μm particles on 10 μm posts, produced with the same dip coating method described previously.

Figure 14:
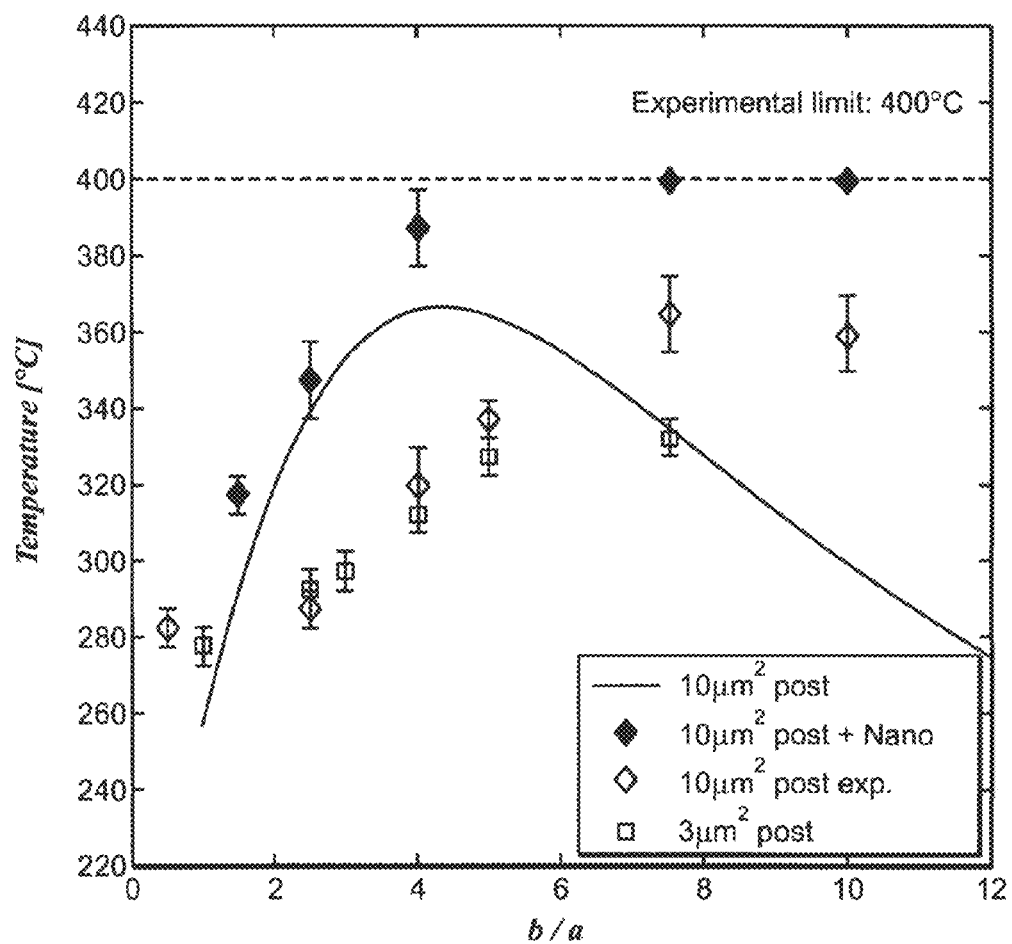
FIG. 14 is a graph of experimental measurements of Leidenfrost temperature versus b/a of multiscale micro-nano structures in comparison to single length-scale microscale structure.

FIG. 14 shows results with multiscale hierarchical micro-nano surfaces when compared to microscale and smooth surfaces. The microposts disposed with nanoparticles (of FIG. 4) show dramatic increases in Leidenfrost temperature and observed nucleate boiling behavior as high as 400° C., the limit of the experiment.

The reference liquid can be selected from the group consisting of aqueous and non-aqueous liquids including water, organic liquids, mixtures, oils, emulsions, liquid metals, liquid nitrogen, liquid $CO_2$, hydrocarbon liquids, liquefied hydrocarbons, liquid helium, and liquefied rare gases.

The surface features described in the application can have shapes selected from the group consisting of a prism, sphere, polyhedron, cone and combinations thereof. Apart from the methods described in this invention several other approaches for material removal or deposition known in the art such as anodization, micromachining, laser processing, nanowire growth, nanocrystal growth, phase seperation, etching techniques, electroplating, spray coating, etc, could be used to fabricate the features. The substrate materials could be drawn from a range of materials including metals, polymers, ceramic, intermetallics, semiconductors, cermets, and combinations thereof.

The textured structures of the invention may be used on the surface of fuel rods in a nuclear reactor. Two-phase flow is present within the fuel rod assembly of a nuclear reactor. This presents the problem of boiling nucleate sites on the fuel rods. There are several issues associated with this. When a nucleate site forms, the liquid moderator is replaced by a vapor moderator. Because vapor is less dense than liquid, two things occur. The heat transfer is decreased due to the lower thermal conductivity of a substance's gas state relative to that of its respective liquid state. To the same effect, the macroscopic neutron scattering cross section is decreased with the decreased density of the moderator. These effects cause random fluctuations in the spatial temperature distribution and the spatial neutron population of the fuel rod and in turn the core of the reactor. All fission, scattering, and absorption cross sections are energy dependent. Thus these fluctuations create fluctuations on all properties throughout the reactor. The symmetry of the fuel is compromised when this occurs and when it does, the lives of the fuel rods are shortened.

Every part of the nuclear reactor core plays a role in its neutron population. Simply by being there, every component is changing the speed and or direction of neutrons. The moderator contains a significant portion of the neutron flux of a nuclear fuel assembly. Its role is to scatter the neutrons back into the core and slow them down so that they are more likely to fission. The implications of placing the structures of the invention on fuel rods will affect the neutron flux of the reactor. Thus by applying these textured structures we are addressing both the heat transfer and the neutronics.

By incorporating textured surfaces to the fuel rods we can control the location of nucleation sites. With this ability, areas of preferential moderation sites can be formed to preserve the integrity of the fuel and increase the performance and power output. Until now, random loss of moderation around the core due to nucleation was an unsolvable problem. With such structures disclosed herein, controlled boiling sites can be implemented to have better control of the moderation. Thus in a lattice of fuel rods the vapor is channeled into optimal placement. At these nucleation sites, high thermal conductivity elements could be present to divert the heat into areas with coolant. At the preferential moderation sites, vapor film formation is prevented and therefore, more fissile material could be present due to better moderation. With these structures, moderator placement becomes part of the design. This would revolutionize the design of nuclear fuel rods.

The quality of a fluid is governed by the temperature, pressure, and volume of the system which it is in. At steady-state in a nuclear reactor, the temperature, pressure and volume are globally constant, thus the amount of vapor and liquid are given. Thus with the usage of these textured structures, selective nucleate states can be formed which "store" the vapor. This storage of vapor will decrease the moderation at their respective sites. In turn, it will increase the concentration of liquid at other locations, allowing for increased moderation. Thus the fuel design can be optimized for this and the fuel would reside under more predictable conditions. Because the presence of two phases cannot be controlled, we suggest that using these structures of the invention can allow for the design of fuel rods which control nucleation and in turn implement necessary features to react to it.

Figure 15A:
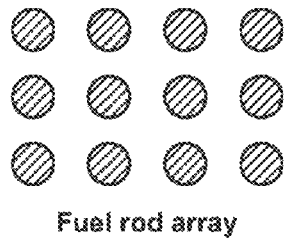
FIGS. 15a, b, c, d and e are schematic illustrations showing the surfaces of the invention used on nuclear reactor fuel rods.
Figure 15B:
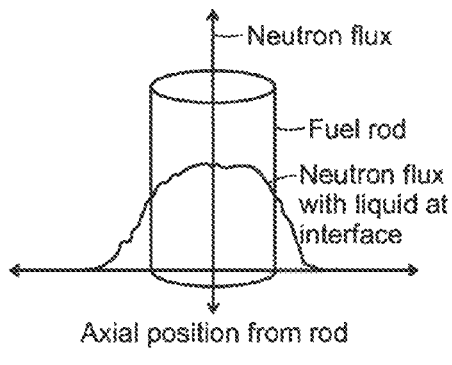
Figure 15C:
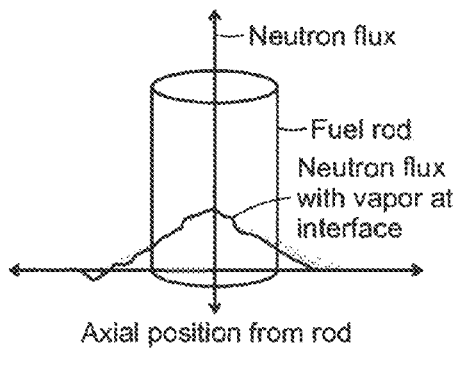
Figure 15D:
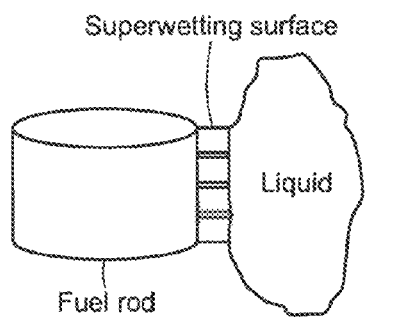
Figure 15E:
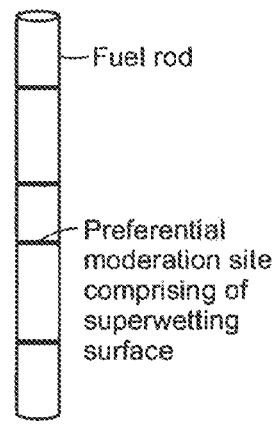

With reference to FIG. 15, FIG. 15a is an array of nuclear reactor fuel rods. FIG. 15b shows neutron flux versus axial position in which a liquid layer effectively moderates the neutrons released in the fission reaction. As shown in FIG. 15c, when a vapor layer is formed (due to boiling) moderation is affected and neutron flux is decreased. As shown schematically in FIG. 15d, a fuel rod has a superwetting surface so that a fuel rod is continuously rewet so that liquid is always present to moderate the neutrons and enhance fission. Superwetting structures can be disposed on a fuel rod surface as shown in FIG. 15e to cause preferential moderation sites.

Figure 16:
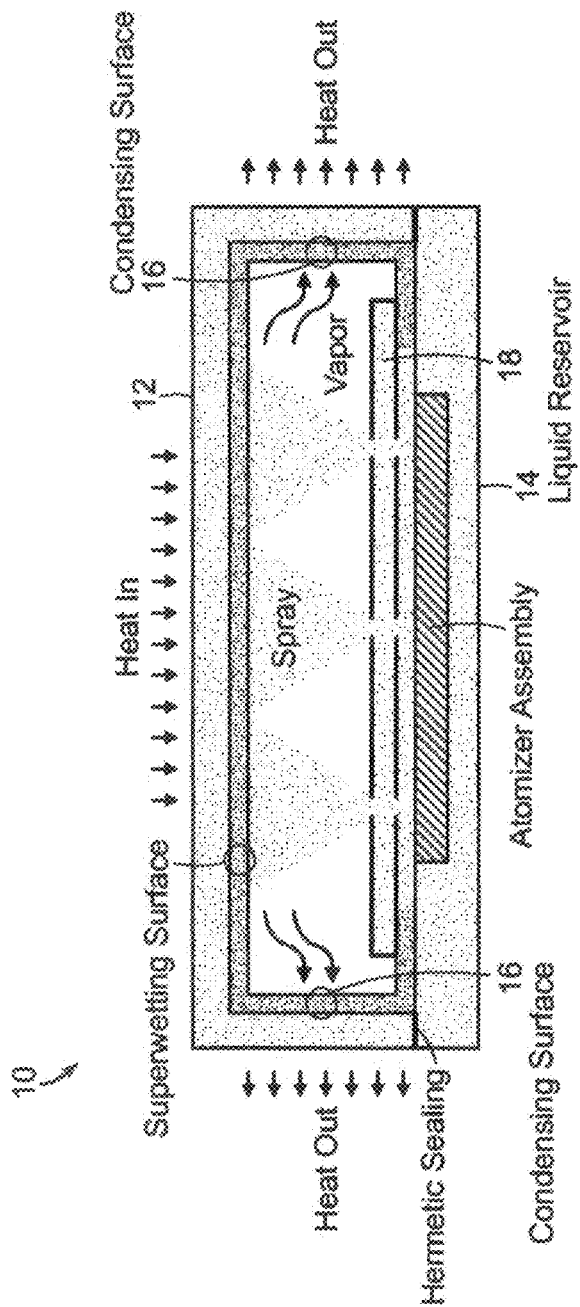
FIG. 16 is a schematic illustration of a heat transfer device utilizing the surfaces of the invention.

A novel heat transfer device utilizing the superwetting structures of the invention will now be described. The schematic of the overall device is provided in FIG. 16. The device 10 includes a high-performance spray cooling system comprising the superwetting heat transfer surface 12 disclosed herein and an atomizer 14 and a condensing surface 16 that are contained in a hermetic envelope. The superwetting surfaces will be engineered as described above to significantly enhance the wetting of the impinging droplets from the spray to undergo complete nucleate boiling by overcoming the fundamental Leidenfrost constraint and thereby dissipating extremely high heat flux. The vapor generated during this process will be condensed onto a condenser that is capable of handling high power densities and transported to a liquid reservoir 18 to complete the closed cycle. The device 10 presented in FIG. 16 consists of two important transport paths: thermal and mass transport. The thermal transport path begins at the heat source, passes through the thickness of the envelope of the device, superwetting surface, vapor transport region, and finally ends at the condenser and reaches the cooling source through the thickness of the envelope as shown in FIG. 16. The mass transport involves the flow of atomizing liquid droplets that are converted into vapor at the superwetting surface, and finally condensed into liquid in the condenser to feed the reservoir. The entire system will be assembled into a hermetic package that can allow easy integration with existing thermal management systems. The nanoengineered-surface-enabled technological innovations described herein will fundamentally alter thermal-fluid-surface interactions to dramatically enhance system performance. Calculations for a 5 cm×5 cm×1 cm device show that the device is capable of dissipating high heat flux ~10 kW/cm$^2$ flux, with high heat transfer coefficients for spray cooling and condenser ~500,000 W/m$^2$K and an overall device effective conductivity of 100,000 W/mK. In this era of rapidly increasing power densities, these technologies will enable a monumental thermal technological leap and bring about a paradigm shift to thermal management of high-performance military and commercial electronic systems.

The contents of the two references cited above are incorporated herein by reference in their entirety.

It is recognized that modifications and variations of the invention disclosed herein will be apparent to those of ordinary skill in the art and it is intended that all such modifications and variations be included within the scope of the appended claims.

What is claimed is:

1. Article for increasing Leidenfrost temperature comprising:
   a surface with a plurality of multiscale hierarchical structures including microscale and nanoscale features both having super wetting properties and forming protrusions, cavities, or combinations of both on the surface, the structures having a median size a, median aspect ratio h/a and median spacing ratio b/a selected to increase Leidenfrost temperature.

2. The article of claim 1 wherein the protrusions and cavities can have multiscale hierarchical features Wherein median size of an "nth" level hierarchy is $a_n$, aspect ratio $(h/a)_n$, and spacing ratio $(ba)_n$.

3. The article of claim 1 wherein a is less than 1000 microns.

4. The article of claim 3 wherein 0.01<b/a<30.

5. The article of claim 3 wherein 0.01<h/a<50.

6. The article of claim 3 wherein 0.1<b/a<20.

7. The article of claim 3 wherein 0.1<h/a<20.

8. The article of claim 3 wherein 0.1<b/a<10.

9. The article of claim 3 wherein 0.1<h/a<5.

10. The article of claim 1 where in a<100 microns.

11. The article of claim 10 wherein 0.01<b/a<30.

12. The article of claim 10 wherein 0.01<h/a<50.

13. The article of claim 10 wherein 0.1<b/a<20.

14. The article of claim 10 wherein 0.1<h/a<20.

15. The article of claim 10 wherein 0.1<b/a<10.

16. The article of claim 10 wherein 0.1<h/a<5.

17. The article of claim 1 wherein a<20 microns.

18. The article of claim 17 wherein 0.01<b/a<30.

19. The article of claim 17 wherein 0.01<h/a<50.

20. The article of claim 17 wherein 0.1<b/a<20.

21. The article of claim 17 wherein 0.01<h/a<20.

22. The article of claim 17 wherein 0.1<b/a<10.

23. The article of claim 17 wherein 0.1<h/a<5.

24. The article of claim 2 wherein $a_{n+1}/a_n<0.1$.
25. The article of claim 24 wherein $0.01<b/a<30$.
26. The article of claim 24 wherein $0.01<h/a<50$.
27. The article of claim 24 wherein $0.1<b/a<20$.
28. The article of claim 24 wherein $0.1<h/a<20$.
29. The article of claim 24 wherein $0.1<b/a<10$.
30. The article of claim 24 wherein $0.1<h/a<5$.
31. The article of claim 1 wherein the structures have shapes selected from the group consisting of a prism, sphere, polyhedron, cone and combinations thereof.
32. The article of claim 1 wherein the structures are made of materials with an intrinsic wetting angle less than 90 degrees.
33. The article of claim 1 wherein the structures are made of materials with an intrinsic wetting angle less than 50 degrees.
34. The article of claim 1 wherein the structures are made of materials with an intrinsic wetting angle less than 20 degrees.
35. The article of claim 1 selected from the group consisting of metal, ceramic, polymer, intermetallic, cermet, semimetal.
36. The article of claim 1 wherein the structures are multiscale structures formed from a combination of metal, ceramic, polymer, intermetallic, cermet, semimetal.
37. The article of claim 1 wherein a high-surface energy surface modification layer is further deposited on the surface to increase Leidenfrost temperature.
38. The article of claim 37 wherein the surface modification layer is a coating selected from the group consisting of a ceramic, polymer, metal, cermet, intermetallic.
39. The article of claim 38 wherein the coating comprises the surface energy modification coating layer, wherein the layer comprises a ceramic material, a hydrophilic polymer material, or a combination comprising at least one of the foregoing materials; wherein the ceramic material comprises titanium oxide, silicon oxide, copper oxide, aluminum oxide, 460 magnesium oxide, zirconium oxide, zinc oxide, iron oxide, yttrium stabilized zirconia, magnesium aluminate spinel, aluminum nitride, gallium nitride, silicon carbide, tungsten carbide cobalt chromium, or a combination comprising at least one of the foregoing.
40. The article of claim 37 wherein the surface modification layer is ion implanted.
41. The article of claim 37 wherein the surface modification layer is a diffusion layer.
42. The article of claim 37 wherein the surface modification layer is a self-assembled monolayer.
43. The article of claim 1 including multiscale structures wherein the multiscale structures are fabricated via heat treatment.
44. The article of claim 1 including multiscale structures wherein the multiscale structures are fabricated via deposition or growth of smaller length scale features onto larger length scale features.
45. The article of claim 1 or 2 wherein the surface is a boiler surface.
46. The article of claim 1 or 2 wherein the surface is an evaporator surface.
47. The article of claim 1 or 2 wherein the surface is a nuclear fuel rod and cladding surface.
48. A fuel rod comprising of preferential moderation sites that comprise of the article of claim 1 that are disposed on the surface of the fuel rod that is in contact with the fluid flowing or impinging on the surface to locally control fission at these preferred sites and maintain integrity of the fuel.
49. A fuel rod array wherein select fuel rod surfaces will be disposed with the article of claim 1 for preferential moderation.
50. The article of claim 1 wherein the surface is a heat transfer surface that is cooled by impingement of fluid.
51. The article of claim 50 wherein the fluid is selected from the group consisting of aqueous and non-aqueous liquids including water, organic liquids, mixtures, oils, emulsions, liquid metals, liquid nitrogen, liquid CO2, hydrocarbon liquids, liquefied hydrocarbons, liquid helium, and liquefied rare gases.
52. The article of claim 1 wherein the surface is on an electronic or photonic device.

* * * * *